United States Patent [19]
Golin

[11] Patent Number: 5,990,980
[45] Date of Patent: Nov. 23, 1999

[54] DETECTION OF TRANSITIONS IN VIDEO SEQUENCES

[75] Inventor: Stuart Jay Golin, East Windsor, N.J.

[73] Assignee: Sarnoff Corporation, Princeton, N.J.

[21] Appl. No.: 09/086,373

[22] Filed: May 28, 1998

Related U.S. Application Data

[60] Provisional application No. 60/068,774, Dec. 23, 1997.

[51] Int. Cl.$^6$ .................................................. H04N 5/14
[52] U.S. Cl. ............................................................ 348/700
[58] Field of Search ................................... 348/699–701, 348/416; 345/328; 382/107, 209, 190, 195, 197, 286; H04N 5/14

[56] References Cited

U.S. PATENT DOCUMENTS

| | | | |
|---|---|---|---|
| 5,459,517 | 10/1995 | Kunitake et al. ........................ | 348/700 |
| 5,521,841 | 5/1996 | Arman et al. ............................. | 345/112 |
| 5,642,294 | 6/1997 | Taniguchi et al. ....................... | 348/700 |
| 5,708,767 | 1/1998 | Yeo et al. ................................. | 395/140 |
| 5,751,378 | 5/1998 | Chen et al. ............................... | 348/700 |
| 5,767,922 | 6/1998 | Zabih et al. .............................. | 348/700 |
| 5,801,765 | 9/1998 | Gotoh et al. ............................. | 348/700 |
| 5,835,163 | 11/1998 | Liou et al. ................................ | 348/700 |
| 5,900,919 | 5/1999 | Chen et al. ............................... | 348/700 |
| 5,920,360 | 7/1999 | Coleman et al. ......................... | 348/700 |

OTHER PUBLICATIONS

"Comparing Images Using Color Coherence Vectors", by Ramin Zabih, Greg Pass, and Justin Miller, Computer Science Department, Cornell University, Ithaca, NY, 1996, 15 pages.

"Content–Based Representation and Retrieval of Visual Media: A State–of–the–Art Review", by Philippe Aigrain et al., Multimedia Tools and Applications 3, 1996 Kluwer Academic Publishers, Manufactured in the Netherlands, pp. 179–202.

"Rapid Scene Analysis on Compressed Video", by Boon–Lock Yeo and Bede Liu, IEEE Transactions on Circuits and Systems for Video Technology, vol., 5, No. 6, Dec. 1995, pp. 533–544.

"A Fast Algorithm for Video Parsing Using MPEG Compressed Sequences", Ke Shen and Edward J. Delp, 1995 IEEE, pp. 252–255.

(List continued on next page.)

*Primary Examiner*—Vu Le
*Attorney, Agent, or Firm*—William J. Burke

[57] ABSTRACT

Frame dissimilarity measure (FDM) values are generated for pairs of frames in a video sequence that are separated by a specified timing window size, where each FDM value is the ratio of a net dissimilarity measure and a cumulative dissimilarity measure. In one embodiment, a first threshold condition is applied to identify peaks in the FDM data that could correspond to transitions between shots in a video sequence. A second threshold condition is applied to the FDM data adjacent to the detected peaks to identify frames at the start and end of the transition. The first threshold condition determines whether the FDM values exceed a first specified threshold level, while the second threshold condition determines whether the FDM values fall below a second specified threshold level. The net and cumulative dissimilarity measures may be based on histograms for the two frames. The present invention is effective in detecting gradual transitions between shots, such as wipes, dissolves, and fades, as well as abrupt transitions, such as cuts.

24 Claims, 7 Drawing Sheets

OTHER PUBLICATIONS

"Comparison of Video Shot Boundary Detection Techniques", by John S. Boreczky and Lawrence A. Rowe, Journal of Electronic Imaging 5(2), Apr. 1996, pp. 122–128.

"Comparison of Automatic Video Segmentation Algorithms", Apostolos Dailianas, Robert B. Allen, and Paul England, SPIE vol. 2615, Jun. 1995, pp. 2–16.

"Scene Change Detection and Content–Based Sampling of Video Sequences", By Behzad Shahraray, SPIE vol. 2419, Jan. 1995, pp. 2–13.

"Detecting and Compressing Dissolve Regions in Video Sequences With a DVI® Multimedia Image Compression Algorithm", by Adnan M. Alattar, 1993 IEEE, pp. 13–16.

"Automatic Video Indexing an Full–Video Search for Object Appearances", by Akio Nagasaka and Yuzuru Tanaka, Visual Database Systems II, Elsevier Science Publishers B.V. (North–Holland), 1992 IFIP, pp. 113–127.

"A Survey of Technologies for Parsing and Indexing Digital Video", by Gulrukh Ahanger and Thomas D.C. Little, Journal of Visual Communication and Image Representation, vol. 7, No. 1, Mar., pp. 28–43, 1996, Article No. 0004, pp. 28–43.

"Automatic Partitioning of Full–Motion Video", by HongJiang Zhang, Atreyi Kankanhalli, and Stephen W. Smoliar, Multimedia Systems (1993), pp. 10–28.

FIG. 2

```
1    PARAMETER DEFINITIONS:
2    n:           CURRENT FRAME IN VIDEO SEQUENCE (FRAME AT RT SIDE OF WINDOW)
3    R(n):        FRAME DISSIMILARITY MEASURE FOR CURRENT FRAME
4    w:           SIZE OF WINDOW FOR FRAME DISSIMILARITY MEASURE FOR R
5    N:           NUMBER OF FRAMES IN VIDEO SEQUENCE
6    next:        NEXT FRAME IN VIDEO SEQUENCE
7    noise(m):    NOISE LEVEL AT FRAME m
8    s:           LEFT FRAME IN WINDOW AT START OF TRANSITION
9    e':          RIGHT FRAME IN WINDOW AT END OF TRANSITION
10   e:           LEFT FRAME IN WINDOW AT END OF TRANSITION
11   T1:          FIRST THRESHOLD VALUE
12   T2:          SECOND THRESHOLD VALUE
13   M1:          FIRST THRESHOLD MULTIPLIER
14   M2:          SECOND THRESHOLD MULTIPLIER
15
16   T1 = 0.5; T2 = 0.25; M1 = 4; M2 = 1.5;
17   n = w;
18   WHILE (n < N) {
19          next = n + 1;
20          IF (R(n) > max(T1, M1*noise(n)) {
21                 s = max(m), such that m < n and R(m) < max(T2,M2*noise(m));
22                 e' = min(m), such that m > n and R(m) < max(T2,M2*noise(m));
23                 next = e' + 1;
24                 e = e' - w;
25                 IF (e <= s) CONTINUE:
26                 REPORT s,e of TRANSITION;
27          }
28          n = next;
29   }
```

```
1    STATIC CONST DOUBLE T1=1, T2=.5, M1=4, M2=3, wt=.95;
2    STATIC DOUBLE noise=0;
3    STATIC INT STATE=noTRANS,
4         sH, epH,              /* FIRST AND LAST FRAMES WITH R>tH */
5         sL;                   /* 1ST FRAME OF POTENTIAL TRANSITION
6                                  (LAST FRAME W/ R>tL) */
7
8    ANALYZE (n)                /* n IS ASSUMED TO INCREMENT SEQUENTIALLY */
9    {
10        R = R(n)              /* ASSUME n >= w (WINDOW SIZE) */
11
12        nmax = min (R, T1);   /* UNFILTERED NOISE (ANALOG TO BIAS (r) */
13        noise = wt * noise + (1 - wt * nmax; /* RECURSIVE FILTER */
14
15        tL = max(noise * M2, T2);   /* LOWER THRESHOLD */
16        tH = max(noise * M1, T1);   /* UPPER THRESHOLD */
17
18        SWITCH (state) {
19        CASE noTRANS:         /* NO TRANSITION IN PROGRESS */
20            IF (R > tL) {     /* INIT FOR POSSIBLE TRANSITION */
21            sL = n - 1;
22            STATE = possibleTRANS;
23            }
24            IF (R > tH) {
25            STATE = probableTRANS;
26            epH = sH = n;
27            }
28            BREAK;
29        CASE possibleTRANS:   /* POSSIBLE TRANSITION IN PROGRESS */
30            IF (R < = tL) STATE = noTRANS;
31            ELSE IF (R > tH) {
32            STATE = probableTRANS;
33            epH = sH = n;
34            }
35            BREAK;
36        CASE probableTRANS:   /* PROBABLY TRANSITION IN PROGRESS */
37            IF (R > = tL) {   /* STILL IN TRANSITION */
38            IF (R > tH) epH = n; /* UPDATE LAST FRAME IN TRANSITION */
39            BREAK;
40            }
41            STATE = noTRANS;  /* END OF TRANSITION */
42            eH = epH - w;     /* ADJUST FOR SIZE OF WINDOW */
43            eL = n - w;       /* TRUE END OF TRANSITION */
44            IF (eL < sH OR eH < sL) BREAK;  /* TRANSITION NOT REAL */
45            ReportTRANSITION (sL, eL);
46            BREAK;
47
48
```

FIG. 7

DETECTION OF TRANSITIONS IN VIDEO SEQUENCES

This non-provisional U.S. national application, filed under 35 U.S.C. § 111(a) claims, under 35 U.S.C. § 119(e)(1), the benefit of the filing date of provisional U.S. application No. 60/068,774, filed under 35 U.S.C. § 111 (b) on Dec. 23, 1997.

STATEMENT REGARDING FEDERALLY SPONSORED RESEARCH OR DEVELOPMENT

The Government of the United States of America has certain rights in at least part of this invention pursuant to Government Contract No. MDA-904-95-C-3126.

BACKGROUND OF THE INVENTION

1. Field of the Invention

The present invention relates to video processing, and, in particular, to the detection of transitions, such as cuts, wipes, and dissolves, in sequences of digital video images.

2. Description of the Related Art

Images, or frames, in a digital video sequence are typically represented by arrays of picture elements or pixels, where each pixel is represented by one or more different components. For example, in a monochrome gray-scale image, each pixel is represented by a component whose value corresponds to the intensity of the pixel. In an RGB color format, each pixel is represented by a red component, a green component, and a blue component. Similarly, in a YUV color format, each pixel is represented by an intensity (or luminance) component Y and two color (or chrominance) components U and V. In 24-bit versions of these color formats, each pixel component is represented by an 8-bit value.

A typical video sequence is made up of sets of consecutive frames called shots, where the frames of a given shot correspond to the same basic scene. A shot is an unbroken sequence of frames from one camera. There is currently considerable interest in the parsing of digital video into its constituent shots. This is driven by the rapidly increasing availability of video material, and the need to create indexes for video databases. Parsing is also useful for video editing and compression.

One way to distinguish different shots in a digital video sequence is to analyze histograms corresponding to the video frames. A frame histogram is a representation of the distribution of component values for a frame of video data. For example, a 32-bin histogram may be generated for the 8-bit Y components of a video frame represented in a 24-bit YUV color format, where the first bin indicates how many pixels in the frame have Y values between 0 and 7 inclusive, the second bin indicates how many pixels have Y values between 8 and 15 inclusive, and so on until the thirty-second bin indicates how many pixels have Y values between 248 and 255 inclusive.

Multi-dimensional histograms can also be generated based on combinations of bits from different components. For example, a three-dimensional (3D) histogram can be generated for YUV data using the 4 most significant bits (MSBs) of the Y components and the 3 MSBs of the U and V components, where each bin in the 3D histogram corresponds to the number of pixels in the frame having the same 4 MSBs of Y, the same 3 MSBs of U, and the same 3 MSBs of V.

One general characteristic of video sequences is that, for certain typos of histograms, the histograms for frames within a given shot are typically more similar than the histograms for frames in shots corresponding to different scenes. As such, one way to parse digital video into its constituent shots is to look for the transitions between shots by comparing histograms generated for the frames in the video sequence. In general, frames with similar histograms are more likely to correspond to the same scene than frames with dissimilar histograms.

The difference between two histograms can be represented mathematically using metrics called dissimilarity measures. One possible dissimilarity measure $D_{abs}(m,n)$ corresponds to the sum of the absolute values of the differences between corresponding histogram bin values for two frames m and n, which can be represented by Equation (1) as follows:

$$D_{abs}(m,n) \equiv \Sigma_i |hd_i(m)-h_i(n)| \tag{1}$$

where $h_i(m)$ is the $i^{th}$ bin value of the histogram corresponding to frame m and $h_i(n)$ is the $i^h$ bin value of the histogram corresponding to frame n. Another possible dissimilarity measure $D_{sq}(m,n)$ corresponds to the sum of the squares of the differences between corresponding histogram bin values, which can be represented by Equation (2) as follows:

$$D_{sq}(m,n) \equiv \Sigma_i |h_i(m)-h_i(n)|^2 \tag{2}$$

Each of these dissimilarity measures provides a numerical representation of the difference, or dissimilarity, between two frames.

A cut is an abrupt transition between two consecutive shots, in which the last frame of the first shot is followed immediately by the first frame of the second shot. Such abrupt transitions can be detected with good reliability by analyzing histogram differences between each pair of consecutive frames in the video sequence, and identifying those pairs of consecutive frames whose histogram differences exceed a specified (and typically empirically generated) threshold as corresponding to cuts in the video sequence.

Unlike cuts, gradual transitions in video sequences, such as dissolves, fades, and wipes, cannot be detected with adequate reliability using histogram differences based on consecutive frames. A dissolve is a transition between two shots in which the pixel values of the second shot steadily replace the pixel values of the first shot over a number of transition frames, where the individual pixels of the transition frames are generated by blending corresponding pixels from the two different shots. A blended pixel $p_b$ may be defined by Equation (3) as follows:

$$P_b = (1-f)^* p_1 + f^* p_2 \leq f \leq 1, \tag{3}$$

where $p_1$ is the corresponding pixel from the first shot, $p_2$ is the corresponding pixel from the second shot, and f is the blending fraction. As a dissolve progresses from one transition frame to the next, the blending fraction f is increased. As such, the influence of the pixels from the first shot in the blending process gets smaller, while the influence of the pixels from the second shot gets greater, until, at the end of the transition, each pixel corresponds entirely to a pixel from the second shot.

A fade is a transition in which the pixels of a shot are gradually changed over a number of transition frames until the image is all one color. For example, in a fade to black, the intensities or luminances of the pixels are steadily decreased until the image is all black. A fade can be viewed as a particular type of dissolve in which the second shot corresponds to a solid color.

A wipe is a transition between two shots in which the pixels of the second shot steadily replace the pixels of the first shot over a number of transition frames, where the individual pixels of the transition frames are generated by selecting pixel values from either the first shot or the second shot. As a wipe progresses from one transition frame to the next, the number of pixel values selected from the first shot decreases, while the number of pixel values from the second shot increases, until, at the end of the transition, all of the pixels are from the second shot.

In gradual transitions, such as dissolves, fades, and wipes, the histogram differences between consecutive transition frames, as measured by dissimilarity measures such as those defined in Equations (1) and (2), might not be significantly different from the histogram differences between consecutive frames within a given shot. As such, using histogram differences based on consecutive frames will not provide a reliable measure for detecting gradual transitions in video sequences.

To detect gradual transitions, Zhang, et al., "Automatic partitioning of full-motion video," *Multimedia Systems*, Vol. 1, No. 1, pp. 10–28 (1993), introduce a twin-comparison method that has two thresholds. This method first evaluates the dissimilarity between adjacent frames and uses the lower of the two thresholds to indicate the potential starting frame s of a gradual transition. It then evaluates D(s,s+k) for each frame s+k for which D(s+k−1,s+k) exceeds this lower threshold. A gradual transition is identified when D(s,s+k) exceeds the higher of the two thresholds (i.e., similar to one used for an abrupt transition). Despite some refinements to allow for variations between adjacent frames, this method is confounded by motion. Camera motion can be identified by motion analysis, but the impact of object motion is much more difficult.

Yeo, et al., "Rapid Scene Analysis on Compressed Video," *IEEE Transactions on Circuits and Systems for Video Technology*, Vol. 5, No. 6, pp. 533–544 (1995) detect transitions by evaluating D(n-w,n) for all n, where the fixed timing window w is selected to be significantly larger than the number of frames in a transition. This method is resistant to motion, but requires some knowledge of expected transition lengths.

Shahraray, "Scene change detection and content-based sampling of video sequences," *Digital Video Compression: Algorithms and Technologies* 1995, Proc. SPIE 2419, pp. 2–13 (1995), applies a recursive temporal filter to D(n-w,n), where w may exceed 1. His analysis includes order statistics and a motion indicator.

Alattar, "Detecting and Compressing Dissolve Regions in Video Sequences with a DVI Multimedia Image Compression Algorithm," *Proceedings of the IEEE International Symposium on Circuits and Systems*, May 3–6, 1993, Chicago, Ill., pp. 13–16, uses the variance of pixel values to identify dissolves. This method is also resistant to motion but does not appear to apply to other types of gradual transitions, such as wipes.

SUMMARY OF THE INVENTION

The present invention is directed to a scheme for detecting transitions between shots in digital video sequences. The present invention can be used to detect abrupt transitions, such as cuts, as well as gradual transitions, such as dissolves and wipes. As such, the present invention can be a useful tool in parsing video sequences into their constituent shots.

In one embodiment, a frame dissimilarity measure (FDM) value is generated for each of a plurality of pairs of frames in the video sequence that are separated by a timing window size, wherein the FDM value is the ratio of a net dissimilarity measure and a cumulative dissimilarity measure. The FDM values are analyzed to identify transitions in the video sequence.

In an alternative embodiment, an FDM value is generated for each of a plurality of pairs of frames in the video sequence that are separated by a timing window size. A first threshold condition is applied to an FDM value to determine if the corresponding pair of frames corresponds to a transition. If the first threshold condition is satisfied, then a second threshold condition is applied to one or more other FDM values to identify start and end frames for the transition.

BRIEF DESCRIPTION OF THE DRAWINGS

Other aspects, features, and advantages of the present invention will become more fully apparent from the following detailed description, the appended claims, and the accompanying drawings in which:

FIG. 2 presents a listing of pseudocode corresponding to the analysis phase of the processing of FIG. 1;

FIG. 7 shows pseudocode for a one-pass analysis, according to one embodiment of the present invention.

DETAILED DESCRIPTION

According to the present invention, a video sequence is analyzed by generating a frame dissimilarity measure (FDM) for pairs of frames that are separated in the video sequence by a specified timing window size. If the value of the FDM satisfies a first threshold condition, then the corresponding pair of frames is (at least tentatively) identified as being part of a transition between two consecutive shots in the video sequence. The frames at the start and end of that transition are then identified by applying a second threshold condition to the FDM values.

A start frame is defined as the frame just before a transition begins and an end frame is defined as the frame just after the transition is completed. That is, the start frame is the last frame that is generated entirely from the first shot and the end frame is the first frame that is generated entirely from the second shot. Between the start and end frames are the transition frames, which are generated from both the first and second shots.

In one embodiment of the present invention, a frame dissimilarity measure R(m,n) is defined for two frames m and n by Equation (4) as follows:

$$R(m,n) \equiv D_{net}(m,n)/D_{cum}(m,n) \qquad (4)$$

where $D_{net}(m,n)$ is the net dissimilarity between frames m and n, and $D_{cum}(m,n)$ is the cumulative dissimilarity between frames m and n.

The net dissimilarity $D_{net}(m,n)$ is defined by Equation (5) as follows:

$$D_{net}(m,n) \equiv \Sigma_i |h_i(m) - h_i(n)|^\gamma \quad (5)$$

where $h_i(m)$ is the $i^{th}$ bin value of the histogram corresponding to frame m, and $h_i(n)$ is the $i^{th}$ bin value of the histogram corresponding to frame n. The parameter $\gamma$ is usually specified to be 2, although any other positive value can be used. When $\gamma=2$, the net dissimilarity $D_{net}(m,n)$ may be said to be the sum of the squares of the differences between the corresponding bin values of the histograms corresponding to frames m and n.

The cumulative dissimilarity $D_{cum}(m,n)$ is defined by Equation (6) as follows:

$$D_{cum}(m,n) \equiv \Sigma^{n-1}_{k=m} D_{net}(k,k+1) \quad (6)$$

As such, the cumulative dissimilarity $D_{cum}(m,n)$ may be said to be the sum of the net dissimilarities between each consecutive pair of frames between frame m and frame n inclusive.

Figure 1:
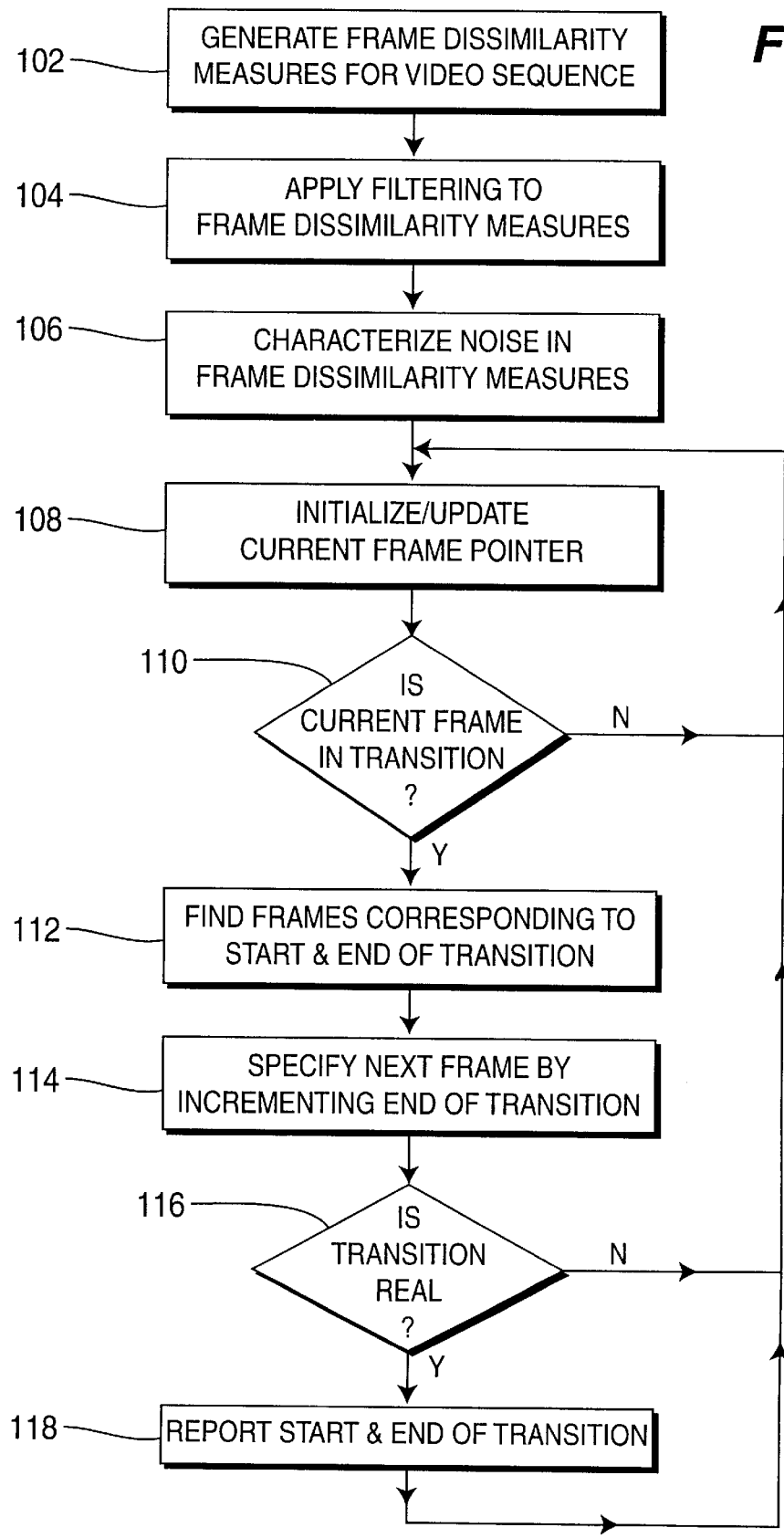
FIG. 1 shows a flow diagram of the processing for detecting transitions in digital video sequences, according to one embodiment of the present invention.

FIG. 1 shows a flow diagram of the processing for detecting transitions in digital video sequences, according to one embodiment of the present invention. The processing of FIG. 1 uses the frame dissimilarity measure R(m,n) defined in Equation (4) to identify transitions between shots in a video sequence, which appear as peaks in the FDM data. A first threshold condition is applied to identify a potential peak by determining whether the FDM values exceed a specified threshold. A second threshold condition is then applied to identify the boundaries of the peak (i.e., the start and end frames of the transition) by determining whether the FDM values fall below a specified lower threshold. The processing of FIG. 1 is designed to identify both abrupt transitions, such as cuts, as well as gradual transitions, such as dissolves and wipes.

The processing of FIG. 1 begins with the generation of the frame dissimilarity measure (FDM) of Equation (4) for each pair of frames in the video sequence that are separated in time by a specified timing window size w (step 102 of FIG. 1). In other words, if frame n is the frame at the right side of the timing window, then frame m=(n-w) is the frame at the left side of the timing window, where the video sequence progresses from "left" to "right" when time is plotted along the X axis of a conventional XY graph.

The FDM data are optionally filtered using, for example, a 3-tap median filter (step 104). If filtering is applied, then the rest of the processing is applied to the filtered FDM data. Otherwise, the original FDM data are used.

The average local noise is then estimated for the filtered FDM data, so that the boundaries of the peaks in the FDM data might be identified (step 106). Noise is preferably characterized by biasing the FDM data toward small values and then filtering the biased data. In one embodiment, the biasing involves the application of a biasing function bias(R), where bias(R)=tanh(2R)/2, and the filtering involves the application of a Gaussian filtering function of the form exp$\{-(d/b)^2\}$, where d is the number of frames from the filtered frame, and b is a specified constant (e.g., 40).

After this initial processing of steps 102–106, the FDM values are analyzed to identify transitions between shots in the video sequence. This data analysis is a processing loop that starts with the frames at the beginning of the video sequence and scans through the data to the frames at the end of the video sequence. FIG. 2 presents a listing of pseudocode corresponding to this analysis phase of the processing of FIG. 1.

The analysis phase begins with the initialization of certain parameters used in applying the first and second threshold conditions (see line 16 in FIG. 2), where $T_1$ and $T_2$ are first and second threshold values, and $M_1$ and $M_2$ are first and second threshold multipliers. The particular parameter values shown in FIG. 2 are typical values that were derived empirically by testing different known video sequences.

Since the FDM of Equation (4) is based on pairs of frames at opposite ends of a sliding timing window having a size w, the current frame pointer n, which indicates the frame at the right side of the timing window, is initialized to w (step 108 in FIG. 1 and line 17 in FIG. 2), where it is assumed that the first frame in the frame sequence is frame 0.

The processing then scans through the video sequence looking for transitions. A first threshold condition is applied to determine whether the current frame n corresponds to a transition between two shots in the video sequence (step 110 in FIG. 1). According to line 20 in FIG. 2, this first threshold condition is satisfied when the FDM value for the current frame n is greater than the maximum of two values: (a) the first threshold value $T_i$ and (b) the product of the first threshold multiplier $M_1$ and the noise level at the current frame n. Note that, since a fixed timing window size w is used, the FDM value R(m,n) of Equation (4) will be R(n-w,n), which be may also represented as R(n), where n specifics the frame at the right side of the timing window.

If the first threshold condition is satisfied, then the FDM data are analyzed to identify the start and end frames for the transition (step 112 in FIG. 1). This is accomplished by (1) scanning to the left in the video sequence to look for the first frame s to the left of the current frame n that satisfies a second threshold condition (line 21 in FIG. 2) and (2) scanning to the right in the video sequence to look for the first frame e' to the right of the current frame n that satisfies the second threshold condition (line 22 in FIG. 2). According to lines 21 and 22, the second threshold condition is satisfied when the FDM value for a frame m is less than the maximum of two values: (a) the second threshold value $T_2$ and (b) the product of the second threshold multiplier $M_2$ and the noise level at frame m.

When a transition is detected, the next frame pointer is set equal to the frame that immediately follows frame e' in the video sequence (step 114 in FIG. 1 and line 23 in FIG. 2). Frame e' corresponds to the frame at the right side of the timing window immediately after the completion of the transition to the second shot. According to the definition given earlier, the end frame is the first frame generated entirely from the second shot. As such, the end frame for the transition is actually the frame at the left side of the timing window. The end frame e is therefore identified by subtracting the timing window size w from the frame number for frame e' (see line 24 of FIG. 2).

If, after adjusting for the size of the timing window, it turns out that the frame identified as the end of the transition (e) is not to the right of the frame identified as the start of the transition (s), then the detected transition is rejected (step 116 in FIG. 1 and line 25 in FIG. 2). This step discriminates against short-term noise in the FDM data, such as might be caused by camera flashes or other anomalies, such as very close objects, that appear in the scene for a time period shorter than the timing window size w. When such anomalous frames are detected, it may be advantageous to ignore them by excluding their contribution to $D_{cum}$ of Equation (6).

Otherwise, the frames s and e are determined to be the start and end frames, respectively, for a transition between shots in the video sequence (step 118 in FIG. 1 and line 26 in FIG. 2). The processing of FIG. 1 then returns to step 108 to update the current frame pointer n for the next application of the first threshold condition. Lines 18–19, 23, and 28 of FIG. 2 are bookkeeping steps that implement the progression through the video sequence.

Figure 3:
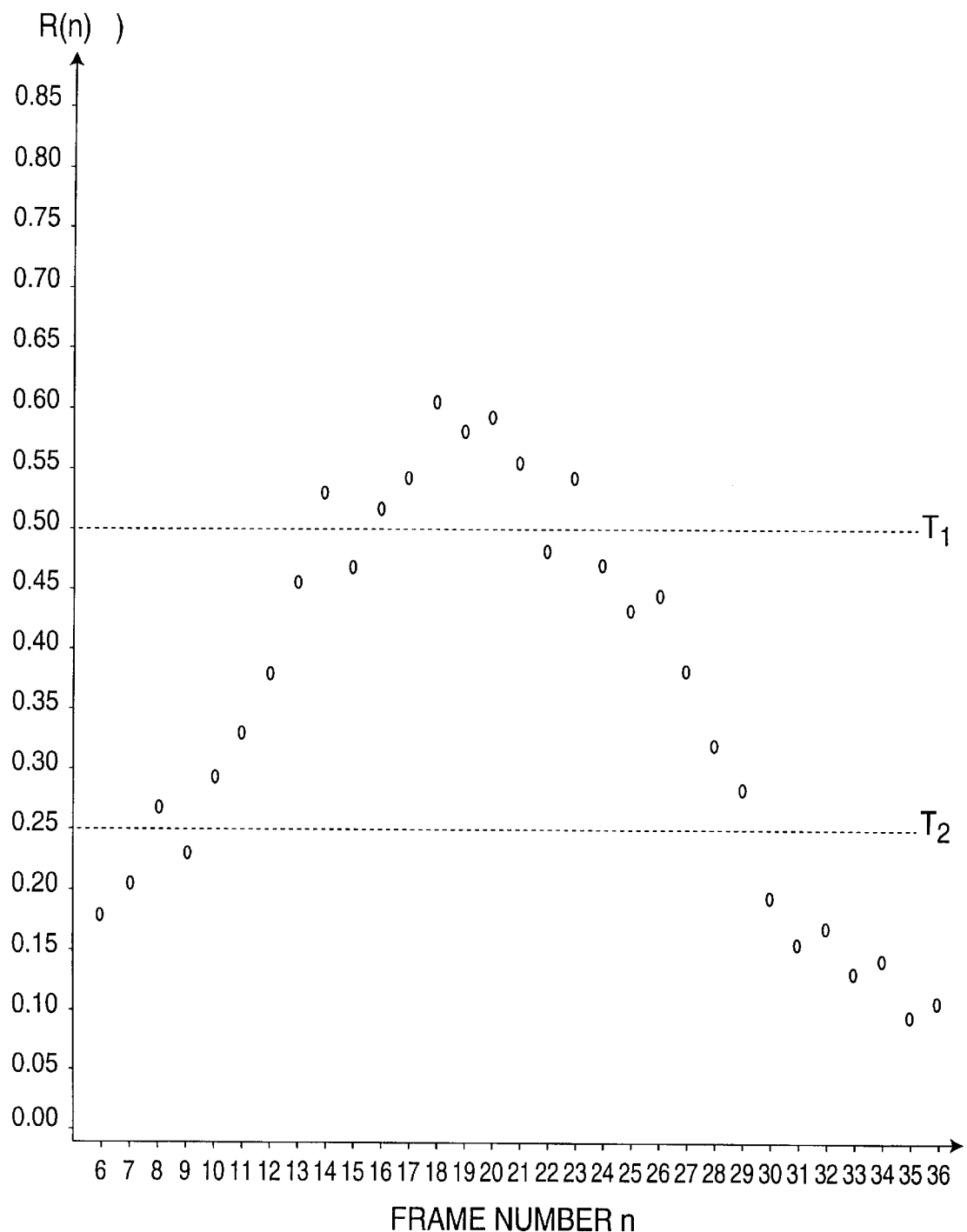
FIG. 3 shows an exemplary set of frame dissimilarity measure (FDM) values for a number of frames of a video sequence to demonstrate the processing of FIGS. 1 and 2.

FIG. 3 shows an exemplary set of FDM values for a number of frames of a video sequence in order to demonstrate the processing of FIGS. 1 and 2. For purposes of this example, it is assumed that the noise in the FDM data is sufficiently low such that the selected first and second threshold values $T_1=0.50$ and $T_2=0.25$, respectively, always determine whether or not the first and second threshold conditions are satisfied. It is also assumed that the FDM values are generated using a timing window size of 6. This means, for example, that the frame dissimilarity measure R(n) for frame n=11 characterizes the difference between frame 11 and frame (n-6) or 5.

Applying the processing of FIGS. 1 and 2 to the data of FIG. 3, the FDM data begin at frame n=6 (since the timing window size is 6). The processing continues from left to right applying the first threshold condition to the FDM data until it is determined that R(n) for frame n=14 exceeds the first threshold value $T_1=0.50$. At this point in the processing, the FDM data are scanned in both directions from frame n=14 to find the first frame to the left of frame n=14 that satisfies the second threshold condition (i.e., frame s=9) and the first frame to the right of frame n=14 that satisfies the second threshold condition (i.e., frame e'=30). Since frame e' corresponds to the right side of the timing window after the transition is completed, frame e=e'-w=30-6=24 is identified as the end frame for the transition.

Although the present invention was designed primarily to detect gradual transitions, it is also effective in detecting abrupt transitions like cuts, where there are no transition frames. This is demonstrated in FIG. 4, which shows an exemplary set of FDM values corresponding to a cut that occurs between frames 20 and 21 in a video sequence, where frame 20 is the last frame of the first shot corresponding to frames 0–20, and frame 21 is the first frame of the second shot corresponding to frames 21–36. For purposes of explanation, each frame in the first shot is assumed to correspond to a single fixed image, and each frame in the second shot is assumed to correspond to a different fixed image. The timing window size is assumed to be w=6.

Figure 4:
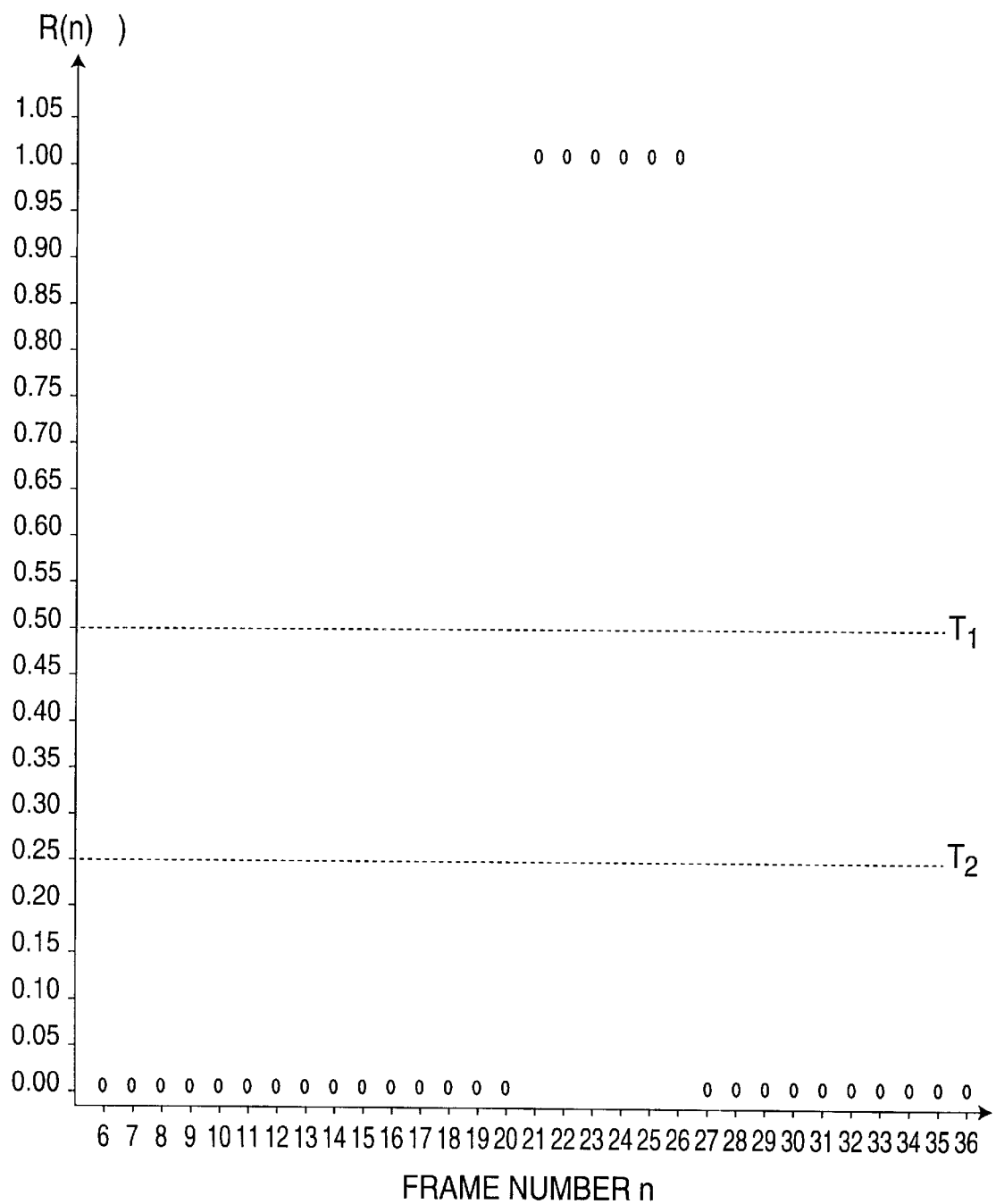
FIG. 4 shows an exemplary set of FDM values corresponding to a cut.

As shown in FIG. 4, since each frame within the first shot is the same, the frame dissimilarity measures R(n) for n=6 to n=20 are all zero. The frame dissimilarity measure R(n) is defined to be zero when the net dissimilarity $D_{net}$ is zero, even if the cumulative dissimilarity $D_{cum}$ is also zero. Note that R(n=20) represents the difference between frame 20 and frame 14 for a timing window size of 6. Since frame n=21 represents the first frame of the second shot, R(n=21) corresponds to the difference between frame 21 of the second shot and frame 15 of the first shot. As such, the frame dissimilarity measure R(n=21) will be non-zero. Similarly, R(n=22) corresponds to the difference between frame 22 of the second shot and frame 16 of the first shot, and so on until frame n=26, where R(n=26) corresponds to the difference between frame 26 of the second shot and frame 20 of the first shot. At frame n=27, however, R(n=27) will be zero, since frames 27 and 21 are both from the second shot. The same is true for the rest of the FDM values of FIG. 4, since they also compare frames within the second shot.

When the processing of FIGS. 1 and 2 is applied to the example of FIG. 4, frame n=21 will be identified as the first frame that satisfies the first threshold condition. Frames s=20 and e'=27 will then be identified as the first frames to the left and right of frame n=21, respectively, that satisfy the second threshold condition. Adjusting e'=27 for the timing window size of 6, frame s=20 and frame e=21 will be correctly identified as the start and end frames, respectively, for the transition between the first and second shots.

Figure 5A:
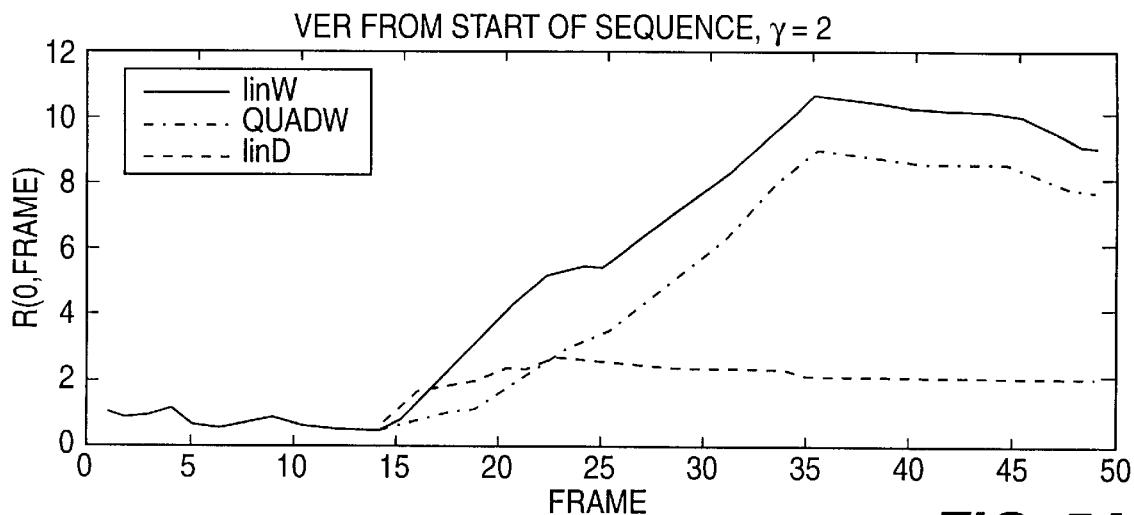
FIGS. 5(A)–(C) show experimental results of generating FDM values for three different test sequences.
Figure 5B:
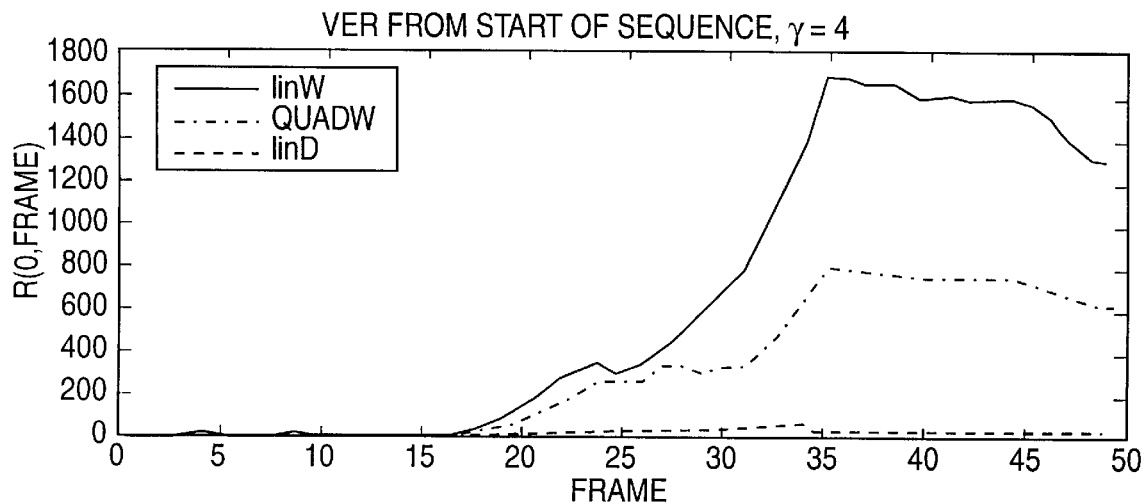
Figure 5C:
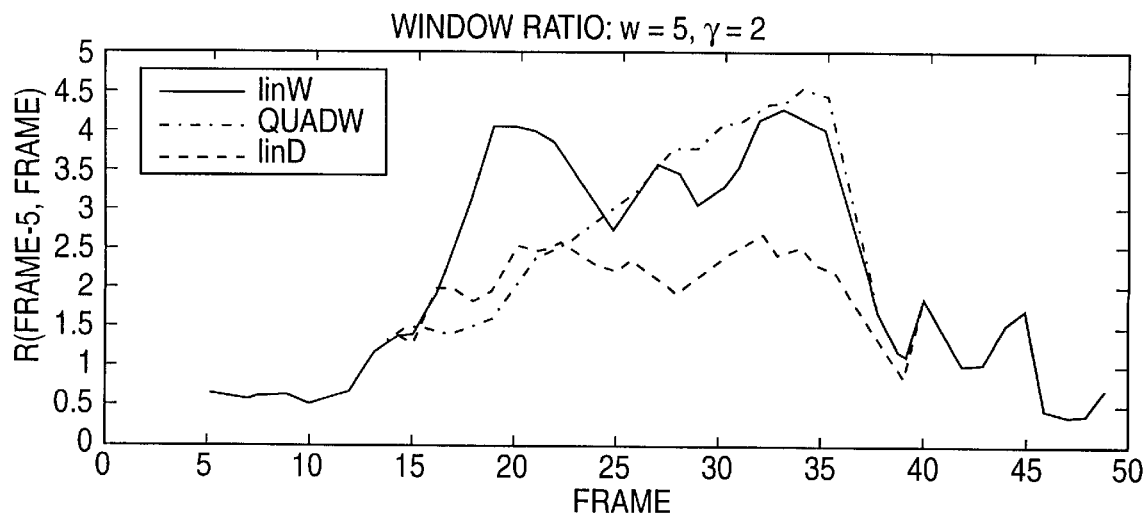

FIGS. 5(A)–(C) show experimental results of generating FDM values for three different test sequences. The three 50-frame test sequences were created from the MPEG4 sequences Stefan (Class C) and Foreman (Class B). These test sequences all start with the same 15 frames of Stefan (frames 0–14) and end with the same 15 frames of Foreman (frames 35–49). They differ in how the 20 transition frames (frame 15–34) were created. The three test sequences were generated based on three different types of gradual transitions: a linear wipe (linW), a quadratic wipe (quadW), and a linear dissolve (linD).

A linear wipe is a wipe in which the number of pixels selected from the second shot grows linearly over the transition frames. A typical linear wipe is one in which a wipe edge that separates pixels selected from the second shot from pixels selected from the first shot is a vertical line that moves from left to right across the transition frames at a constant rate. The test sequence linW of FIGS. 5(A)–(C) was generated by replacing Stefan with Foreman in a left-to-right vertical wipe.

A quadratic wipe is a wipe in which the number of pixels selected from the second shot grows quadratically over the transition frames. A typical quadratic wipe is one in which the wipe edge defines a rectangle, where pixels within the rectangle are selected from the second shot and pixels outside of the rectangle are selected from the first shot, where the height and width of the rectangle both increase at constant rates over the transition frames. The test sequence quadw of FIGS. 5(A)–(C) was generated by substituting Foreman in a growing rectangular region at the center of Stefan.

A linear dissolve is a dissolve in which the blending factor f of Equation (3) varies from 0 to 1 at a uniform rate over the transition frames. The test sequence lind of FIGS. 5(A)–(C) was generated by varying f at a uniform rate from f=0 at frame 14 to f=1 at frame 35.

FIG. 5(A) shows the frame dissimilarity measures R(O,n) of Equation (4), where $\gamma=2$ in Equation (5), such that each frame in the video sequence is compared to the first frame in the video sequence (i.e., frame 0). FIG. 5(B) shows R(O,n) for $\gamma=4$, and FIG. 5(C) shows R(n-5,n) for $\gamma=2$ and a fixed timing window size of 5. In each case, the FDM calculations were based on 3D histograms generated from the 4 MSBs of Y data and the 3 MSBs of both U and V data. The most dramatic difference between the results in FIG. 5(A) for $\gamma=2$ and the results in FIG. 5(B) for $\gamma=4$ is that the response to the wipes (linW and quadw) increased two orders of magnitude, which completely swamps the response at the beginning of the sequence, as well as the response to the dissolve (linD).

Figure 6A:
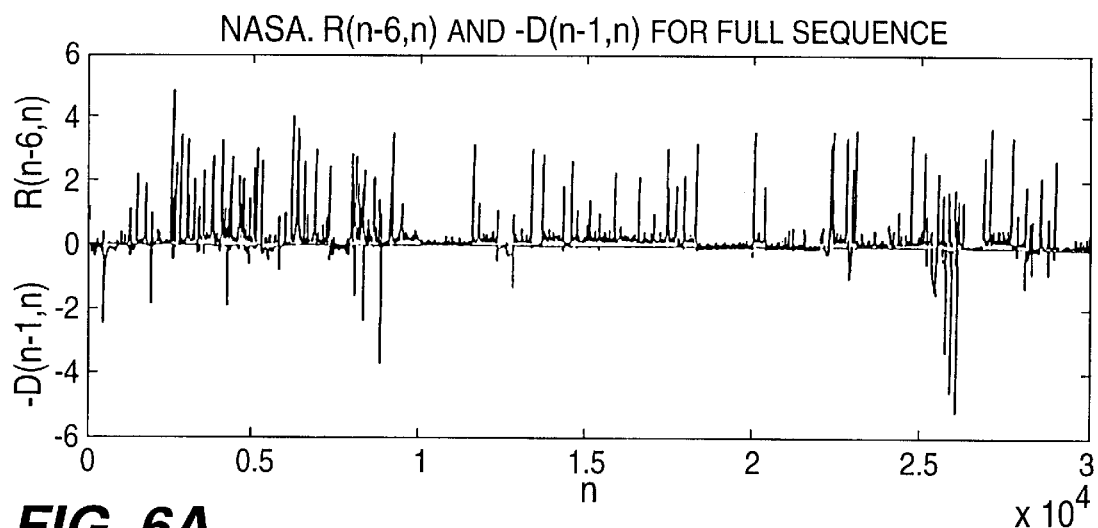
FIGS. 6(A)–(C) show the results of applying the processing of FIGS. 1 and 2 to a particular video sequence.
Figure 6B:
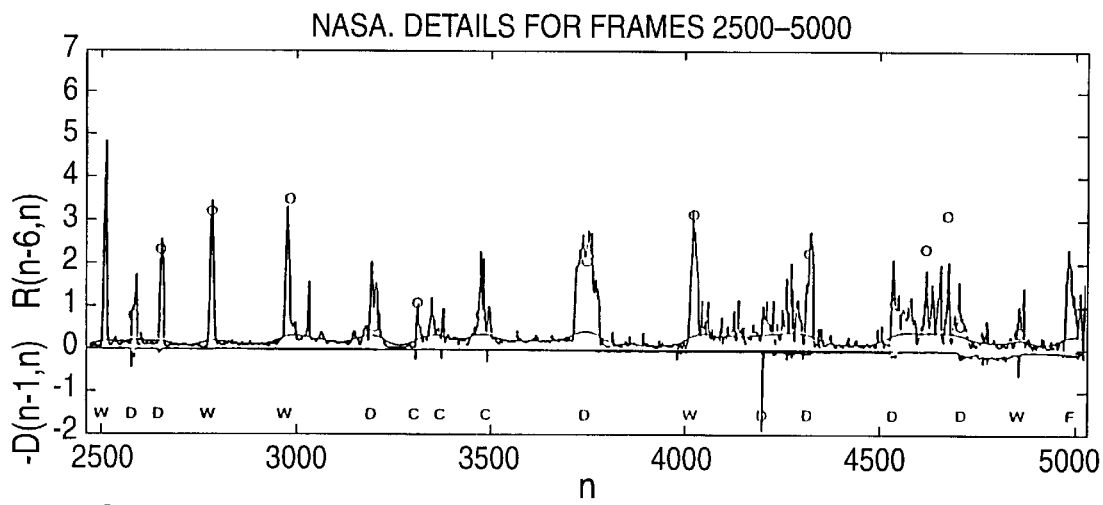
Figure 6C:
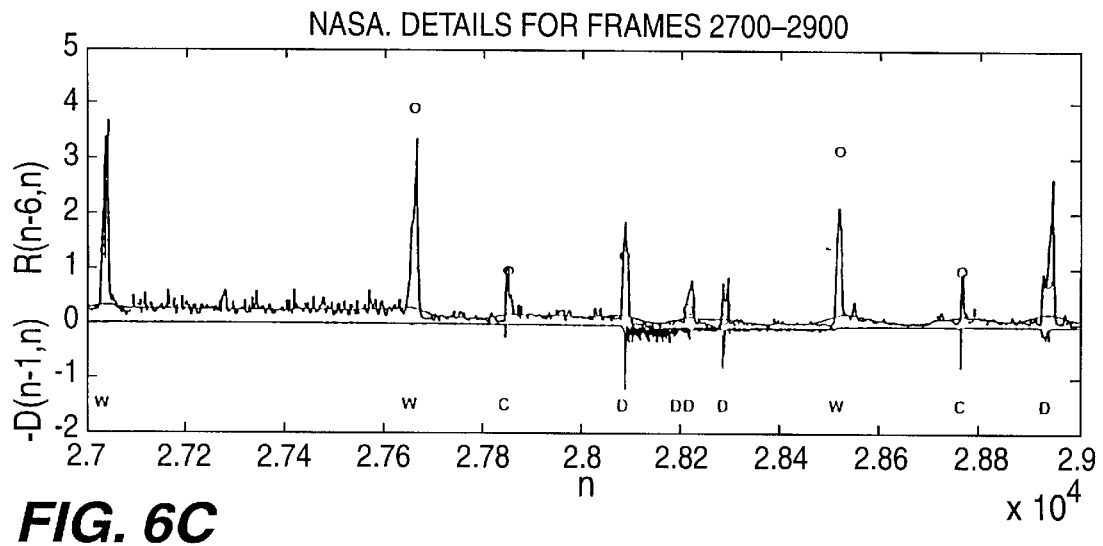

FIGS. 6(A)–(C) show the results of applying the processing of FIGS. 1 and 2 to a 30,001-frame video sequence of 352W×240H images that were MPEG-1 encoded at 15 frames/second. In each of FIGS. 6(A)–(C), the upper portion of the graph plots the frame dissimilarity measure R(n-6,n) of Equation (4) for y=2 and a timing window size of 6, and the lower portion of the graph plots the consecutive-frame dissimilarity measure $D_{sq}(n-1,n)$ of Equation (2) with a negative scaling factor of -50 applied so that both sets of data can be viewed clearly in the same graph. All of these results were generated using the same type of 3D histogram as was used for FIGS. 5(A)–(C).

FIG. 6(A) plots the results for the entire 30,001-frame video sequence. FIG. 6(B) shows a blowup of the results for frames 2500–5000, and FIG. 6(C) shows a blowup of the results for frames 27000–29000. The letters in the lower half of FIGS. 6(B) and 6(C) show the locations and identities of the following types of manually-observed transitions: W=wipe, F=fade, D=dissolve, and C=cut. Note that the dissimilarity measure $D_{sq}$(n-1,n) has almost no response to most wipes, indicating that the consecutive-frame dissimilarity measure of Equation (2) would be unlikely to identify wipes with sufficient reliability.

The circles in the top portions of FIGS. 6(B) and 6(C) show the transition ratios for events identified by the processing of FIGS. 1 and 2. The transition ratio is defined as the frame dissimilarity measure R(s,e) for the transition start and end frames that are identified during the processing of FIGS. 1 and 2. The noise level in the FDM data is indicated by the smooth curves in FIGS. 6(B) and 6(C).

In general, the processing of FIGS. 1 and 2 succeeded in identifying most transitions, whether they were wipes, fades, dissolves, or cuts, with only a few false negatives (i.e., missing an actual transition) and false positives (i.e., identifying a non-transition as a transition). Some obvious peaks are not picked up. The algorithm of FIGS. 1 and 2 considers very narrow peaks to be noise, where the width of a peak depends on the values selected for certain parameters, such as $T_2$ and $M_2$ in the second threshold condition which determines the boundaries of a peak.

For most of the wipes, the magnitude of the transition ratio R(s,e) is comparable to or larger than the corresponding FDM data generated using the fixed timing window size w of 6. This would be expected for wipes longer than w.

Being a dimensionless ratio, the FDM of Equation (4) acts as a kind of normalization function. The range of the peaks in the FDM data is much smaller than that of unscaled $D_{sq}$(n-1,n) data. This should facilitate the selection of thresholds.

In terms of processing efficiency, it may be useful to generate $D_{cum}$(0,x) of Equation (6) for all x>0. For any pair of frames m and n, the cumulative dissimilarity $D_{cum}$(m,n) can be easily generated based on the relationship that $D_{cum}(m,n)=|D_{cum}(0,n)-D_{cum}(0,m)|$.

Alternative Embodiments

The present invention has been described in the context of the processing of FIGS. 1 and 2, in which transitions are detected by comparing FDM values to specified threshold values. The present invention can be supplemented using additional criteria to discriminate against false positives. For example, the transition ratio R(s,e) could be compared to a specified threshold to detect false positives. Another possibility would be to require transitions to have a specified minimum area under the FDM curve to detect false positives. Yet another possibility would be to apply a threshold to $D_{net}$(s,e), the net dissimilarity between the start and end frames of a transition.

The algorithm in FIGS. 1 and 2 applies a particular analysis scheme to detect peaks and identify the corresponding start and end frames in the FDM data. The algorithm in FIGS. 1 and 2 is a two-pass analysis that is particularly suited to situations in which the entire video sequence is stored in memory. Those skilled in the art will understand that peaks can be detected and/or identified by applying different analysis schemes to the FDM data.

For example, in an alternative embodiment, the present invention may be implemented using a one-pass analysis that is suitable to situations in which the data are analyzed as each frame is encountered without necessarily storing the entire video sequence in memory. FIG. 7 shows the pseudocode for a possible one-pass analysis. This one-pass analysis is similar but not identical to the two-pass analysis of FIGS. 1 and 2. For example, in the one-pass analysis, a potential transition is triggered by the lower of two thresholds rather than by the higher threshold. In addition, noise is calculated somewhat differently, there is no median filtering, and the threshold constants are slightly different.

In particular, the one-pass analysis of FIG. 7 corresponds to a state machine having three states: noTrans (i.e., current state does not indicate a transition), possibleTrans (i.e., current state indicates a possible transition), and probableTrans (i.e., current state indicates a probable transition). As the frames in the video sequence are encountered, the function Analyze(n) is applied to each current frame n, where the initial value of n is assumed to be greater than or equal to the specified timing window size w. The function Analyze(n) relies on global variables that are defined and initialized at lines 1–5 in FIG. 7. After calculating the frame dissimilarity measure R for the current frame (line 10), applying a recursive filter to characterize the noise level (lines 12–13), and generating lower and upper thresholds (tL and tH) (lines 15–16), the function Analyze(n) implements appropriate processing depending on the state of the machine after the previous frame.

For the noTrans state (line 19), lines 20–28 are implemented. In particular, if the FDM R for the current frame is greater than the lower threshold tL (line 20), then the first frame of a potential transition is set to the previous frame (n-1) (line 21) and the state is changed to possibleTrans (line 22). If the FDM is also greater than the upper threshold tL (line 24), then the state is changed right away to probableTrans (line 25) and both the first and last frames for the upper threshold are initialized to the current frame n (line 26). Otherwise, the state remains noTrans.

For the possibleTrans state (line 29), lines 30–35 are implemented. In particular, if the FDM R for the current frame is less than or equal to the lower threshold tL (line 30), then the state is changed to noTrans (line 30). This corresponds to a situation in which the FDM values exceeded the lower threshold, but returned to within the lower threshold without ever reaching the upper threshold. Otherwise, if the FDM is greater than the upper threshold tL (line 31), then the state is changed to probableTrans (line 32) and both the first and last frames for the upper threshold are initialized to the current frame n (line 33). Otherwise, the state remains possible Trans.

For the probable Trans state (line 36), lines 37–46 are implemented. In particular, if the FDM R for the current frame is greater than the lower threshold tL (line 37), then, if R is also greater than the upper threshold tH (line 38), then the last frame in the transition is updated to the current frame n (line 38), otherwise processing for the current frame n is terminated (line 39). Otherwise, R is less than or equal to the lower threshold tL, in which case the transition is over. In that case, the state is changed to noTrans (line 41), and the ends of the upper and lower peaks are adjusted for the timing window size (lines 42–43). If the peak is too narrow (line 44), then the transition is rejected. Otherwise, the transition is reported out by the Analyze(n) function (line 45). The test for narrow peaks in line 44 is more complicated than the corresponding test in the two-pass analysis and attempts to treat the start and end of a potential transition more symmetrically.

The present invention has been described for FDM values that are generated for entire frames. In order to distinguish object motion within a scene from gradual transitions between scenes, frames can be divided into sub-frames with each sub-frame analyzed separately. While object motion is likely to show up in only a few of the sub-frames, a transition should be evident in most, if not all, of the sub-frames.

Although the present invention was designed to detect gradual transitions between shots in a video sequence, it can also be used to detect abrupt transitions between shots (i.e., cuts) or even camera motion (e.g., a pan). A pan may be considered to be a type of gradual transition within a shot, especially where the pan results in a significant scene change. There may be utility, for example, in video indexing, in being able to detect pans within shots as well as transitions between shots. Alternatively, a pan may be discriminated from a transition between shots by using motion analysis to detect global motion between the frames of a pan.

Most of the experimental results were based on using $\gamma=2$ in Equation (5). Increasing $\gamma$ reduces the impact of random activity, and increases the impact of wipes with respect to other gradual transitions, as shown in FIGS. 5(A) and 5(B). However, it may also decrease the stability of the algorithm. Note that $\gamma=1$ may also be useful. Although the FDM value will then never exceed unity, it still tends to be much larger at transitions than at other times. Varying the timing window size should help discriminate against random motion that appears systematic on a short time scale.

Although the selection of a timing window size is fairly arbitrary, the particular value selected may affect the noise level in the FDM data for a particular video sequence. For example, in an encoding scheme with some periodicity, selecting a timing window size based on an integer multiple of the encoding period may yield less noise.

The frame dissimilarity measure of Equation (4) is a ratio of dissimilarity measures based on frame histograms. Alternative versions of a frame dissimilarity measure could also be used. For example, the dissimilarity measures could be based on pixel-to-pixel differences (e.g., sum of squares of differences or sum of absolute differences) between frames, rather than on frame histograms.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for identifying transitions in a video sequence, comprising the steps of:
    (a) generating a frame dissimilarity measure (FDM) value for each of a plurality of pairs of frames in the video sequence that are separated by a timing window size, wherein the FDM value is the ratio of a net dissimilarity measure and a cumulative dissimilarity measure; and
    (b) analyzing the FDM values to identify transitions in the video sequence.

2. The invention of claim 1, wherein, for each pair of frames m and n, the FDM value is generated from histograms for two or more frames corresponding to the pair of frames m and n.

3. The invention of claim 1, wherein:
the net dissimilarity measure $D_{net}(m,n)$ is defined by:

$$D_{net}(m,n) \equiv \Sigma_i |h_i(m) - h_i(n)|^\gamma$$

wherein:
   $h_i(m)$ is the $i^{th}$ bin of a histogram corresponding to frame m;
   $h_i(n)$ is the is bin of a histogram corresponding to frame n; and
   $\gamma$ is a specified parameter; and
the cumulative dissimilarity measure $D_{net}(m,n)$ is defined by:

$$D_{cum}(m,n) \equiv \Sigma^{n-1}_{k=m} D_{net}(k,k+1).$$

4. The invention of claim 1, further comprising the step of comparing the relative positions in the video sequence of start and end frames for each identified transition to discriminate against short-term anomalies in the video sequence.

5. The invention of claim 1, wherein step (b) comprises the steps of:
    (1) applying a first threshold condition to an FDM value to determine if a frame in the corresponding pair of frames corresponds to a transition; and
    (2) if the first threshold condition is satisfied, then applying a second threshold condition to one or more other FDM values to identify start and end frames for the transition.

6. The invention of claim 5, further comprising the step of characterizing noise in the FDM values for the video sequence, wherein the first and second threshold conditions are functions of the noise.

7. The invention of claim 6, wherein the noise is characterized by:
    (1) biasing the FDM values toward small values; and
    (2) filtering the biased FDM values.

8. The invention of claim 6 wherein:
the first threshold condition is satisfied when the FDM value for a frame n exceeds the maximum of a first threshold value $T_1$ and the product of a first threshold multiplier $M_1$ and the noise for frame n; and
the second threshold condition is satisfied when the FDM value for a frame m falls below the maximum of a second threshold value $T_2$ and the product of a second threshold multiplier $M_2$ and the noise for frame m.

9. The invention of claim 5, wherein the FDM values are filtered before applying the first and second threshold conditions.

10. The invention of claim 5, wherein:
the first threshold condition is satisfied when an FDM value is greater than a first threshold level; and
the second threshold condition is satisfied when an FDM value is less than a second threshold level.

11. The invention of claim 10, wherein the first threshold level is greater than the second threshold level.

12. The invention of claim 5, wherein:
the first threshold condition is used to identify peaks in the FDM values; and the second threshold condition is used to determine boundaries for the peaks.

13. The invention of claim 1, wherein each frame is divided into two or more sub-frames and an FDM value is generated for each sub-frame in order to distinguish object motion from transitions between shots.

14. The invention of claim 1, wherein step (b) comprises the steps of:
 (1) applying a first threshold condition to an FDM value to determine if a frame in the corresponding pair of frames corresponds to a start frame for a possible transition;
 (2) if the first threshold condition is satisfied, then applying a second threshold condition to one or more other FDM values to determine if the possible transition is a probable transition; and
 (3) if the second threshold condition is satisfied, then applying the first threshold condition to one or more other FDM values to determine an end frame for the probable transition.

15. An apparatus for identifying transitions in a video sequence, comprising:
 (a) means for generating a frame dissimilarity measure (FDM) value for each of a plurality of pairs of frames in the video sequence that are separated by a timing window size, wherein the FDM value is the ratio of a net dissimilarity measure and a cumulative dissimilarity measure; and
 (b) means for analyzing the FDM values to identify transitions in the video sequence.

16. A computer-readable medium having stored thereon a plurality of instructions, the plurality of instructions including instructions which, when executed by a processor, cause the processor to implement a method for identifying transitions in a video sequence, the method comprising the steps of:
 (a) generating a frame dissimilarity measure (FDM) value for each of a plurality of pairs of frames in the video sequence that are separated by a timing window size, wherein the FDM value is the ratio of a net dissimilarity measure and a cumulative dissimilarity measure; and
 (b) analyzing the FDM values to identify transitions in the video sequence.

17. A method for identifying transitions in a video sequence, comprising the steps of:
 (a) generating a frame dissimilarity measure (FDM) value for each of a plurality of pairs of frames in the video sequence that are separated by a timing window size;
 (b) applying a first threshold condition to an FDM value to determine if the corresponding pair of frames corresponds to a transition; and
 (c) if the first threshold condition is satisfied, then applying a second threshold condition to one or more other FDM values to identify start and end frames for the transition.

18. The invention of claim 17, wherein the FDM value is the ratio of a net dissimilarity measure and a cumulative dissimilarity measure, wherein:
 the net dissimilarity measure $D_{net}(m,n)$ is defined by:

$$D_{net}(m,n) \equiv \Sigma_i |h_i(m) - h_i(n)|^\gamma$$

wherein:
 $h_i(m)$ is the $i^{th}$ bin of a histogram corresponding to frame m;
 $h_i(n)$ is the $i^{th}$ bin of a histogram corresponding to frame n; and
 $\gamma$ is a specified parameter; and
the cumulative dissimilarity measure $D_{cum}(m,n)$ is defined by:

$$D_{cum}(m,n) \equiv \Sigma^{n-1}_{k=m} D_{net}(k,k+1).$$

19. The invention of claim 17, further comprising the step of comparing the relative positions of the start and end frames in the video sequence to discriminate against short-term anomalies in the video sequence.

20. The invention of claim 17, further comprising the step of characterizing noise in the FDM values for the video sequence, wherein the first and second threshold conditions are functions of the noise.

21. The invention of claim 17, wherein:
 the first threshold condition is satisfied when an FDM value is greater than a first threshold level to identify peaks in the FDM values; and
 the second threshold condition is satisfied when an FDM value is less than a second threshold level to determine boundaries for the peaks.

22. The invention of claim 17, wherein:
 step (b) comprises the step of applying the first threshold condition to identify the start frame of a possible transition;
 step (c) comprises the step of applying the second threshold condition to determine if the possible transition is a probable transition; and
 further comprising the step of applying the first threshold condition to one or more other FDM values to determine the end frame for the probable transition, if the second threshold condition is satisfied.

23. An apparatus for identifying transitions in a video sequence, comprising:
 (a) means for generating a frame dissimilarity measure (FDM) value for each of a plurality of pairs of frames in the video sequence that are separated by a timing window size;
 (b) means for applying a first threshold condition to an FDM value to determine if the corresponding pair of frames corresponds to a transition; and
 (c) means for applying a second threshold condition to one or more other FDM values to identify start and end frames for the transition, if the first threshold condition is satisfied.

24. A computer-readable medium having stored thereon a plurality of instructions, the plurality of instructions including instructions which, when executed by a processor, cause the processor to implement a method for identifying transitions in a video sequence, the method comprising the steps of:
 (a) generating a frame dissimilarity measure (FDM) value for each of a plurality of pairs of frames in the video sequence that are separated by a timing window size;
 (b) applying a first threshold condition to an FDM value to determine if the corresponding pair of frames corresponds to a transition; and
 (c) if the first threshold condition is satisfied, then applying a second threshold condition to one or more other FDM values to identify start and end frames for the transition.

* * * * *